United States Patent Office 3,346,618
Patented Oct. 10, 1967

3,346,618
PRODUCTION OF ε-CYANOCAPROIC ACID
Horst Metzger and Martin Pape, Ludwigshafen (Rhine), Germany, assignors to Badische Anilin- & Soda Fabrik Aktiengesellschaft, Ludwigshafen (Rhine), Germany
No Drawing. Filed Feb. 2, 1965, Ser. No. 429,885
Claims priority, application Germany, Feb. 7, 1964, B 75,332
5 Claims. (Cl. 260—465.4)

ABSTRACT OF THE DISCLOSURE

Production of ε-cyanocaproic acid by reacting α-cyanocyclohexanone with an alkali metal glycolate, e.g. sodium ethylene glycolate, at an elevated temperature and with substantial exclusion of water such that at least 50 mol percent of the alkali metal ions are present in the form of the alkali glycolate. The resulting alkali metal salt of ε-cyanocaproic acid is then hydrolyzed in a conventional manner to the free acid. ε-Cyanocaproic acid is a useful monomer for the preparation of polyoenantholactam (nylon–7).

---

This invention relates to the production of ε-cyanocaproic acid or more specifically to an improvement in a known method of producing the same.

Polyoenantholactam (also known as nylon-7) is known to be a very interesting polyamide. Attempts have therefore been made for a long time to prepare the monomer of this polyamide or its intermediates by an economical method. None of the prior art proposals has however been permanently adopted in industry because they are too complicated and too expensive.

There is therefore still a great interest in methods which will enable the intermediates of nylon-7 and also nylon-7 itself to be prepared cheaply. ω-Aminooenanthic acid is one of these intermediates, and this may be converted into nylon-7 by eliminating water from the free acid or by eliminating alcohol from an ω-aminooenanthic ester. ω-aminooenanthic acid or its esters may be prepared by prior art methods for example by hydrogenation of ε-cyanocaproic acid or esters of the same.

A method is known according to which α-cyanocyclohexanone (readily accessible for example from alkali metal cyanide and α-halocyclohexanone) is split hydrolytically to ε-cyanocaproic acid:

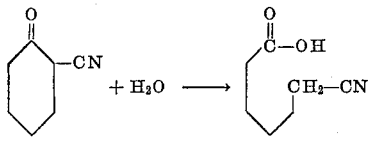

The procedure may be that cyanocyclohexanone is heated with about one to four moles of an alkali metal hydroxide in a glycol at 160° to 200° C. and the reaction mixture is quenched with ice after a few minutes. The yields of ε-cyanocaproic acid obtainable by this method are however only moderate because large amounts of pimelic acid are formed by further hydrolysis. The production of pimelic acid in this way is already known. If complete hydrolysis of the ε-cyanocaproic acid to pimelic acid is to be avoided, only low conversion can be permitted in the production of ε-cyanocaproic acid, while maintaining very short, and therefore difficultly reproducible reaction periods. This prior art method therefore has little suitability for large scale reactions.

It is an object of the present invention to provide an improvement of the known process for the production of cyanocaproic acid by reacting α-cyanocyclohexanone in a glycolic medium at a temperature of 150° to 210° C. and separating the desired product from the reaction mixture which improvement results in higher yields of cyanocaproic acid. It is another object of the invention to provide a process for the production of ε-cyanocaproic acid having high purity. It is a further object to provide a method of producing ε-cyanocaproic acid while avoiding losses due to the formation of pimelic acid. These and other objects of the present invention will be better understood from the following detailed description.

These objects are achieved by carrying out splitting of the α-cyanocyclohexanone using an alkali metal glycolate and while substantially excluding water.

An alkali metal glycolate may be used as such or it may be prepared in situ, prior to adding α-cyanocyclohexanone, for example from a solution of the alkali metal hydroxide in the glycol by distilling off an amount of water equivalent to the amount of alkali metal hydroxide.

The result of the process according to this invention is surprising in that when carrying out the process in the absence of water using an alkali metal glycolate, it is only the undesirable hydrolysis of the nitrile groups which is suppressed and not the hydrolytic cleavage of α-cyanocyclohexanone to ε-cyanocaproic acid although 1 mole of water is also required for this. Presumably α-cyanocyclohexanone has the ability to dehydrate glycols in the presence of alkali at 150° to 250° C. Conversely the glycols act as selective water donors for the cleavage but do not yield any water for hydrolysis of the nitrile. In the particularly clear case using diethylene glycol, the dehydration leads to 1,4-dioxane by intramolecular etherification and the dioxane can be distilled off during the cleavage reaction.

The alkali metal glycolates may be derived from any alkali metal. Alkali metals having atomic weights less than 40 are preferred, i.e. sodium, potassium and lithium. Sodium glycolates are used as a rule.

The glycols used may be for example those of the ethylene, propylene or butylene series having a maximum viscosity of 8 centistokes at 100° C. Examples of such glycols are ethylene, diethylene, triethylene, tetraethylene, pentaethylene, hexaethylene, heptaethylene, octaethylene, nonaethylene, decaethylene, 1,2-propylene, dipropylene, tripropylene, tetrapropylene, pentapropylene, hexapropylene, heptapropylene, octapropylene, 1,3-propylene, 1,2-butylene, 1,3-butylene, 1,4-butylene, dibutylene, tributylene, tetrabutylene, pentabutylene, hexabutylene and heptabutylene glycols.

In most cases the alkali metal glycolate used will be that of the glycol used as solvent, although the alkali metal glycolate may also be derived from a glycol other than that used as solvent. It is preferred to use sodium or potassium diethylene glycolate as the alkali metal glycolate and diethylene glycol as the solvent.

The molar ratio of alkali metal glycolate to cyanocyclohexanone should be from about 1:1 to about 4:1, a ratio of 2:1 being preferred.

By substantial exclusion of water we mean that for example more than 50 mole percent, particularly more than 80 mole percent of the alkali metal ions present is in the form of glycolate or in other words not more than 50 mole percent, particularly not more than 20 mole percent of alkali metal glycolate has been hydrolyzed.

The process according to this invention for the production of ε-cyanocaproic acid is generally carried out by heating to about 150° to 250° C. a solution of an alkali metal hydroxide in a polymolar, for example twice molar to twenty times molar, amount of a glycol and distilling off an amount of water equivalent to the hydroxide, but may also be carried out by reacting metallic alkali metal with the glycol or dissolving a calculated amount of alkali metal glycolate in the glycol; then at a temperature of about 150° to 250° C., preferably at 180° to 200° C., α-cyanocyclohexanone is added while stirring and the reaction solution kept at this temperature for a period ranging from a few minutes to a few hours. After the reaction mixture has been cooled, it is diluted with water, acidified with a mineral acid, such as sulfuric acid, nitric acid or preferably hydrochloric acid, and the ε-cyanocaproic acid is extracted with ether or another inert organic solvent, for example an aromatic hydrocarbon, an alcohol which is immiscible or miscible with water, or a carboxylic ester. Further processing may be by distillation.

The invention is further illustrated by the following example.

*Example*

A mixture of 210 g. of diethylene glycol (about 2 moles) and 33.6 g. of sodium hydroxide (0.84 mole) is placed in a 500 ml. four-necked flask provided with a stirrer, a thermometer, an inlet pipe for nitrogen and a descending condenser. While continuously passing nitrogen through the flask, the mixture is heated to about 200° C. on an oilbath. 16.1 g. of a liquid which according to a Karl Fischer titration consists to the extent of 91% of water (0.81 mole) distils off. 47.2 g. of α-cyanocyclohexanone (0.38 mole) is then added at a temperature of 180° C. Dioxane begins to distil off after a short time. Ninety minutes later the reaction is stopped and the reaction mixture is poured onto ice. The reaction mixture is brought to a pH value of 1 with 75 ml. of concentrated hydrochloric acid and then it is extracted five times, each time with 200 ml. of ether. The combined extracts are dried with anhydrous sodium sulfate, ether is removed and by distillation under subatmospheric pressure at about 0.5 mm. Hg, 10.5 g. of unchanged initial material and 35.4 g. of ε-cyanocaproic acid (boiling point at 0.3 mm. Hg: 140° to 150°) having a melting point 26° C. are obtained (yield: 84% of the theory, with reference to reacted cyanocyclohexanone).

If, for comparison, an analogous procedure is followed but without previous removal of water, there are obtained after a reaction period of five minutes and with an 87% conversion, only 15% of the theory of ε-cyanocaproic acid and 54% of the theory of pimelic acid.

We claim:
1. A process for the production of an alkali metal salt of ε-cyanocaproic acid which comprises reacting α-cyanocyclohexanone at a temperature of about 150° C. to 210° C. with an alkali metal glycolate of the ethylene, propylene or butylene series having a maximum viscosity of 8 centistokes at 100° C., the molar ratio of said alkali metal glycolate to said α-cyanocyclohexanone being about 1:1 to 4:1, while substantially excluding water such that at least 50% of the alkali metal ions are present in the form of the glycolate.

2. A process as claimed in claim 1 wherein the alkali metal glycolate is a sodium glycolate.

3. A process as claimed in claim 1 wherein the alkali metal glycolate is an alkali metal ethylene glycolate.

4. A process as claimed in claim 1 wherein the alkali metal glycolate is sodium ethylene glycolate.

5. A process for the production of ε-cyanocaproic acid which comprises: reacting α-cyanocyclohexanone at a temperature of about 150° C. to 210° C. with an alkali metal glycolate of the ethylene, propylene or butylene series having a maximum viscosity of 8 centistokes at 100° C., the molar ratio of said alkali metal glycolate to said α-cyanocyclohexanone being about 1:1 to 4:1, while substantially excluding water such that at least 50% of the alkali metal ions are present in the form of the glycolate; and acidifying the reaction mixture to hydrolyze the resulting alkali metal salt of ε-cyanocaproic acid into the free acid.

References Cited

UNITED STATES PATENTS 3,050,547    8/1962    Waters et al. _____ 260—465.4

JOSEPH P. BRUST, *Primary Examiner.*